(12) United States Patent
Genschorek (10) Patent No.: US 7,849,849 B2
(45) Date of Patent: Dec. 14, 2010

(54) FRAME ASSEMBLY FOR MOUNTING SOLAR MODULES

(75) Inventor: Gido Genschorek, Rangsdorf (DE)

(73) Assignee: Conergy AG, Rangsdorf (DE)

( * ) Notice: Subject to any disclaimer, the term of this patent is extended or adjusted under 35 U.S.C. 154(b) by 458 days.

(21) Appl. No.: 11/816,044

(22) PCT Filed: Feb. 28, 2005

(86) PCT No.: PCT/DE2005/002332

§ 371 (c)(1),
(2), (4) Date: Aug. 10, 2007

(87) PCT Pub. No.: WO2006/086937

PCT Pub. Date: Aug. 24, 2006

(65) Prior Publication Data

US 2008/0210221 A1    Sep. 4, 2008

(30) Foreign Application Priority Data

Feb. 14, 2005    (DE) .................. 10 2005 007 184

(51) Int. Cl.
*F24J 2/46* (2006.01)
(52) U.S. Cl. .................................. 126/704; 126/623
(58) Field of Classification Search ......... 126/621–623, 126/627, 633, 680, 704–710, 713; 136/251, 136/244, 246; 248/229.22, 219.1, 283.1, 248/287.1, 279.1, 62, 72–73, 188.1; 224/282, 224/497, 309, 321; 108/6
See application file for complete search history.

(56) References Cited

U.S. PATENT DOCUMENTS

| 749,670 | A | * | 1/1904 | Gardner | 248/242 |
| 2,405,877 | A | * | 8/1946 | Delano | 202/234 |
| 4,076,016 | A | * | 2/1978 | Phillips | 126/663 |
| 4,169,738 | A | * | 10/1979 | Luque | 136/246 |
| 4,226,256 | A | * | 10/1980 | Hawley | 136/244 |

(Continued)

FOREIGN PATENT DOCUMENTS

CH    633878 A    * 12/1982

(Continued)

*Primary Examiner*—Kenneth B Rinehart
*Assistant Examiner*—Daniel A Bernstein
(74) *Attorney, Agent, or Firm*—Patent Central LLC; Stephan A. Pendorf; Katherine E. Dover (57) ABSTRACT

The invention relates to a frame assembly for mounting solar modules (1), said frame assembly comprising at least two flat frames which are arranged at a distance, preferably forming a triangle respectively with the frame sides (2, 3, 4) thereof, respectively one frame side (4) being inclined in relation to the surface of the ground or the roof (5). Carrier profiled parts (6, 7) which can be respectively displaced and fixed and are used to support and fix a solar module (1) are respectively arranged on two adjacent frames on the inclined side (4) of the frame. The carrier profiled parts (6, 7) are used to ensure the connection to the adjacently arranged frame sides (2, 3) in such a way that they can be displaced and fixed in relation to each other. The frame sides (2, 3) are also connected in such a way that they can be displaced and fixed in relation to each other and/or comprise at least one length adjustment device.

11 Claims, 5 Drawing Sheets

U.S. PATENT DOCUMENTS

| | | | |
|---|---|---|---|
| 4,421,943 A * | 12/1983 | Withjack | 136/246 |
| 4,499,894 A * | 2/1985 | Buckley | 126/707 |
| 5,228,924 A | 7/1993 | Barker et al. | |
| 5,762,720 A * | 6/1998 | Hanoka et al. | 136/251 |
| 6,205,719 B1 * | 3/2001 | Bruce | 52/147 |
| 6,402,109 B1 * | 6/2002 | Dittmer | 248/284.1 |
| 2002/0033436 A1 * | 3/2002 | Peng et al. | 248/284.1 |
| 2006/0086382 A1 * | 4/2006 | Plaisted | 136/244 |
| 2008/0210221 A1 | 9/2008 | Genschorek | |

FOREIGN PATENT DOCUMENTS

| | | |
|---|---|---|
| DE | 19906464 A1 | 8/2000 |
| DE | 20008509 U1 | 8/2000 |
| DE | 20005209 | 9/2000 |
| DE | 19922795 | 11/2000 |
| DE | 20117280 | 2/2002 |
| DE | 19963545 | 1/2003 |
| DE | 202004005224 U1 | 6/2004 |
| DE | 102005007184 B3 | 6/2006 |
| EP | 0857926 | 8/1998 |
| EP | 1376029 | 1/2004 |

\* cited by examiner

FRAME ASSEMBLY FOR MOUNTING SOLAR MODULES

The invention relates to a frame assembly for the mounting of solar modules, especially on flat roofs. Such frame assemblies can also be used on other surfaces which are flat or have only little inclination.

Carrier arrangements are known which consist of a base body with a triangular or trapezoid cross-section, whereby the solar modules are positioned on the surface inclined with respect to the roof or floor plane.

EP 0 857 926 A1 describes a plastic tub which has an essentially triangular cross-section for the inclined receiving of one or more solar modules. Similarly constructed are the carrier arrangements according to DE 200 08 509 U1 which consists of concrete and DE 201 17 280 U1 with a base body of a heat insulating material.

A carrier arrangement is known from EP 1 376 029 A2 which does not include a closed carrier scaffold, but consists of steel sheets which are bent several times in the sheet plane, whereby an inclined supporting surface for the solar module is provided. The bent sheet steel respectively provides the supporting function at the top and the bottom for the solar module.

Furthermore, frame assemblies are known on which the solar module is adjustably positioned. U.S. Pat. No. 5,228,924 describes a triangular frame assembly with at least two triangles positioned side by side which at the tip of the triangle are connected with one another by an axis around which the actual carrier assembly for the solar module is pivotable. The triangular frame assemblies are bolted to the roof skin or fixed onto a solid base. Instead of the bolt connection, the carrier construction according to DE 199 63 545 C2 uses magnetic force fields.

In addition, a flat roof/floor frame assembly is known from DE 199 22 795 A1 which has a semi-circular module holding arrangement with a groove. The solar module is movable in the groove and thereby fixable at different exposure angles.

It is a disadvantage of the frame assemblies that the carrier profiles are special profiles in order to guarantee the fastening of the solar modules. The fastening of the solar modules normally occurs only on a few points so that a special profile is actually not necessary over the whole module length or width. Furthermore, a plurality of solar modules of different dimensions exist, so that each frame assembly must be adapted to the respective dimensions.

It is an object of the invention to provide a frame assembly which is of triangular shape especially in cross-section for the support of solar modules and which requires reduced special profile use and to guarantee at the same time a flexibility in the adaptation to different solar module dimensions.

This object is achieved with the features according to claim 1, preferred embodiments are the subject of the dependent claims.

The frame assembly in accordance with the invention for the support of solar modules consists of at least two flat frames positioned spaced apart and having frame sides, whereby respectively one frame side is configured at an inclination to the floor or roof surface, carrier profile elements for the supporting and fastening of a solar module are respectively movably and fastenably positioned on the inclined frame side, the carrier profile elements are respectively connected with a frame side adjacent to the frame side, not inclined frame sides are movably and fastenably connected with one another and/or have at least one length adjustment arrangement and one of these frame sides has one or more connections to a roof or floor surface. In a preferred embodiment, the frame sides form a triangular frame, preferably a right triangle, or they form a trapezoid frame. The carrier profile elements are thereby respectively positioned in the end region of the respective frame side in such a way that some of them can be respectively moved beyond the end of the frame side and conversely on the frame side. The frame side length can thereby be shortened or lengthened within limits. At the same time, the carrier profile elements connect adjacent frame sides. With such an arrangement, the frame sides can be made of a simple and therefore economical profile, such as an angle, U or T profile.

In the preferred embodiment, a continuous T profile is used as the carrier profile, the leg of which, in the transitionary region to the foot, is shaped as a U profile and together with the foot forms a box profile. The inner dimensions of the box profile are such that the respective profile of the frame side is insertable into the box profile with a slight play and is then fastenable.

The connection of carrier profiles formed as T profiles with one another and of a T profile with a frame side is preferably carried out respectively in the leg region of the T profile or profiles.

The suggested frame assembly thereby has significant advantages. Compared to previous frame assemblies, at least a 50% savings in material can be realized, especially in that the frame sides for the support of the solar modules now no longer need to be special profiles such as the carrier profile elements.

Products which can be stored and then recalled are available. Special constructions are no longer necessary, since the most often used solar modules of the width of 800 to 1100 mm can be mounted because of the flexibility provided by the frame assembly, on the one hand by movement of the carrier profiles and also by exchange of the frame side for the support of the solar module by rotation of the frame assembly in the frame assembly plane.

In addition, only small parts, mainly the T profile elements need be machined, which is technologically realizable without problems using small automated machinery.

An advantageous embodiment of the frame assembly is illustrated by way of the drawings. It is shown in.

Figure 1:
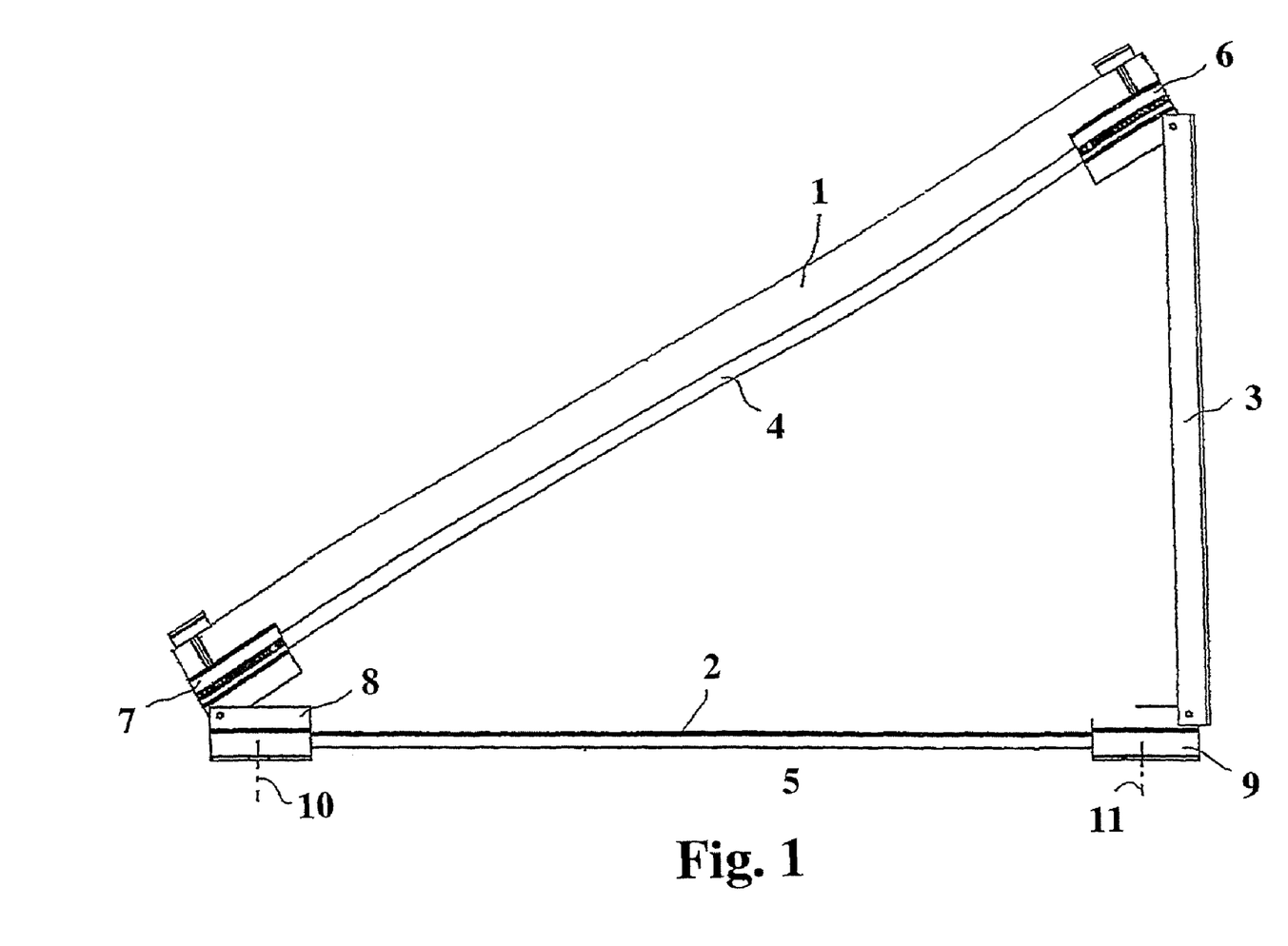
FIG. 1 a triangular frame assembly.

FIG. 1 shoes a frame assembly constructed as a triangular frame for the positioning of solar modules 1. Such frame assemblies are positioned spaced apart so that the solar module 1 can be supported on at least two triangular frames. Each triangular frame consists of the frame sides 2, 3, 4, whereby the frame side 4 is inclined in relation to the floor or roof surface 5. Two carrier profile elements 6, 7 are movably and fastenably arranged on the inclined frame side 4 for the supporting and fastening of the solar module 1. These carrier profile elements 6, 7 are at the same time used to create a connection between the two other frame sides 2, 3. The carrier profile 7 is thereby connected with a carrier profile 8 which is movably and fastenably positioned on the frame side 2 and the carrier profile 6 is directly connected with the frame side 3. Furthermore, the frame side 2 at the other end has a further movable and fastenable profile 9 which is also directly connected with the frame side 3. This configuration guarantees that the frame side 4 can be adjusted with respect to its length within limits, namely by about ⅔ of the length of the carrier profile 6, 7, whereby the carrier profiles 8, 9 are also moved and the angles between the frame sides 2, 3; 4, 3 and 2, 3 are possibly changed.

In a preferred embodiment, the frame sides 2 and/or 3 furthermore include a length adjustment arrangement.

In this embodiment, the frame sides 2 and 4 are angular profiles, while the frame profile 3 consists of a T profile. The T profile has the advantage that respectively half of the foot width can be used for the fastening of a cladding.

It is also apparent from FIG. 1 that the frame sides 2 and 4 are of the same construction as the carrier profiles 9, 10 and 6, 7 pushed thereto. However, the frame side 2 is shorter than the frame side 4.

By rotation of the frame assembly in the frame assembly plane, the frame sides 2 and 4 can be exchanged relative to their location. The fastening of the frame assembly on the roof or floor surface 5 is then carried out by way of the carrier profile 6, 7, while the carrier profiles 8, 9 provide a support for the solar module 1 (see FIGS. 5A-5C, in which this rotation is shown). This provides a further adjustment for the mounting of solar modules 1 in addition to the possible displacement of the carrier profiles 8, 9 without the need for a change in the frame assembly.

Figure 2:
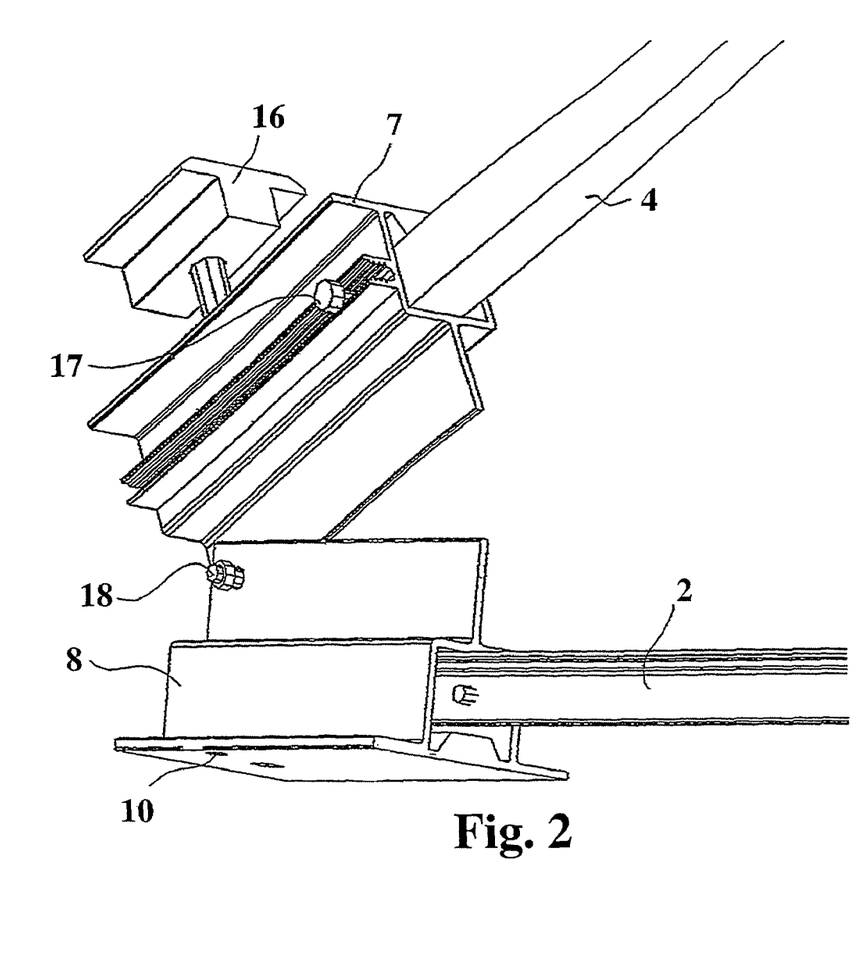
FIG. 2 the connection of two carrier profiles.

FIG. 2 shows that the connection of the carrier profile element 7 with the frame side 2 is carried out by way of a carrier profile 8 which is movably and fastenably positioned on the frame side 2 and connected with the carrier profile 7 by way of a bolt connection 18. It is further apparent that the carrier profile 7 includes a solar module clamp 16 and a bolt element 17.

Figure 3:
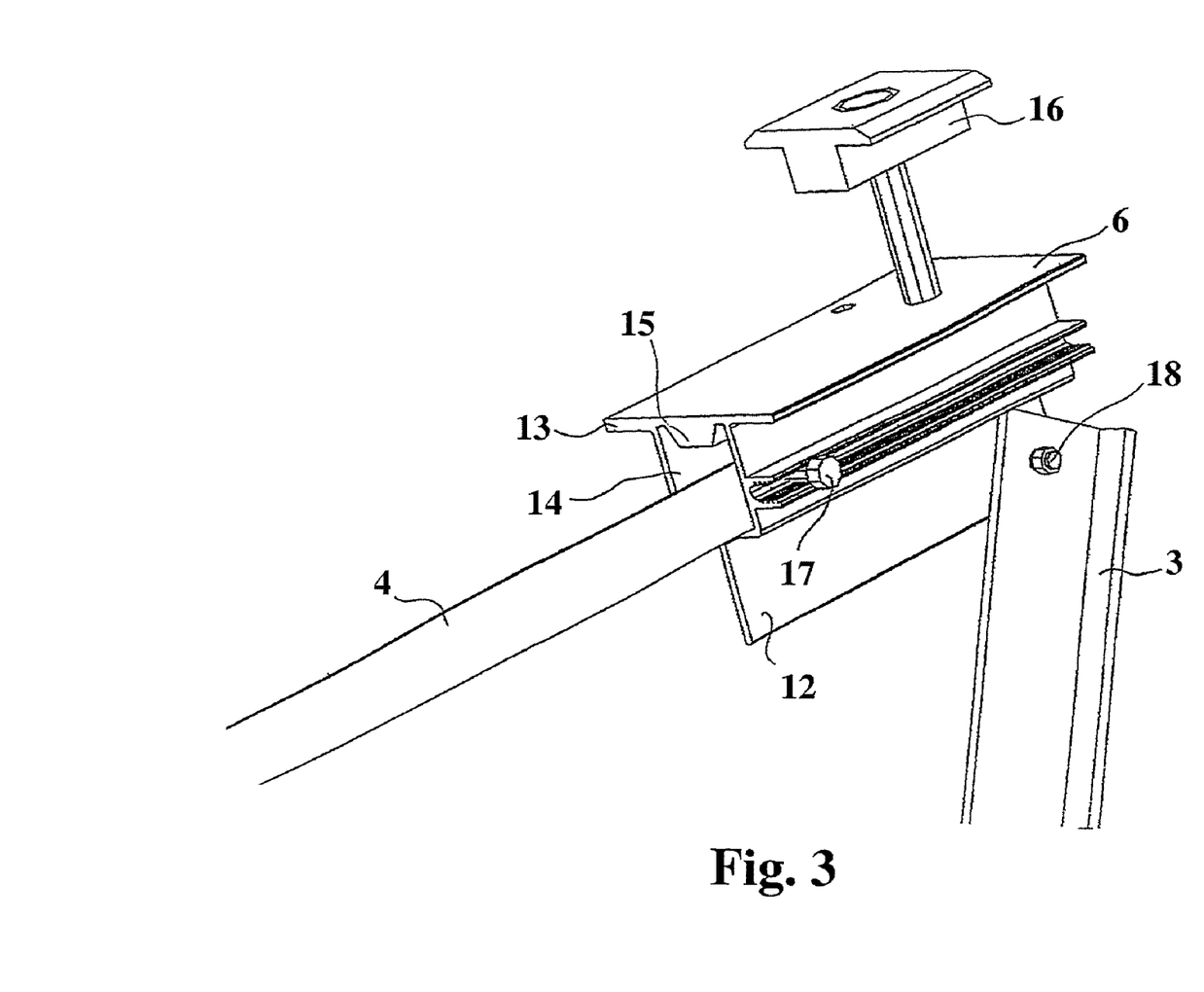
FIGS. 3 and 4 respectively a connection of carrier profile and frame side.
Figure 4:
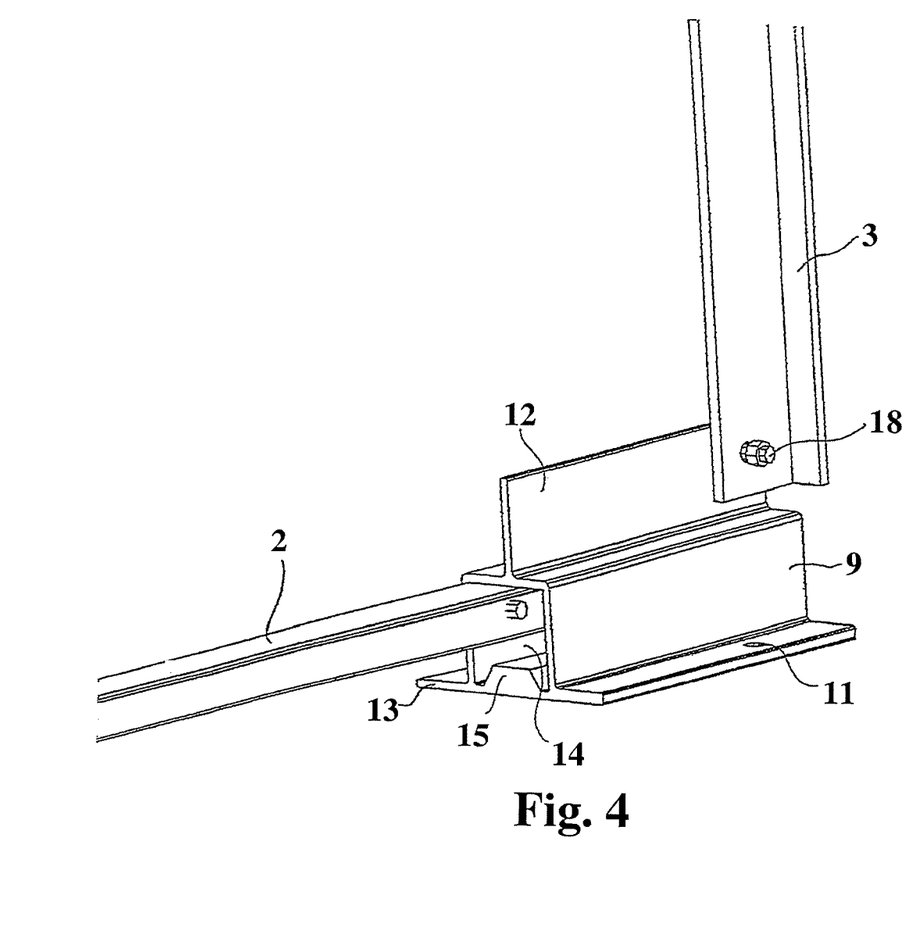

FIGS. 3 and 4 shown in analogous manner the connection of the carrier profile element 6 or 9 with the frame side 3.

Figure 5A:
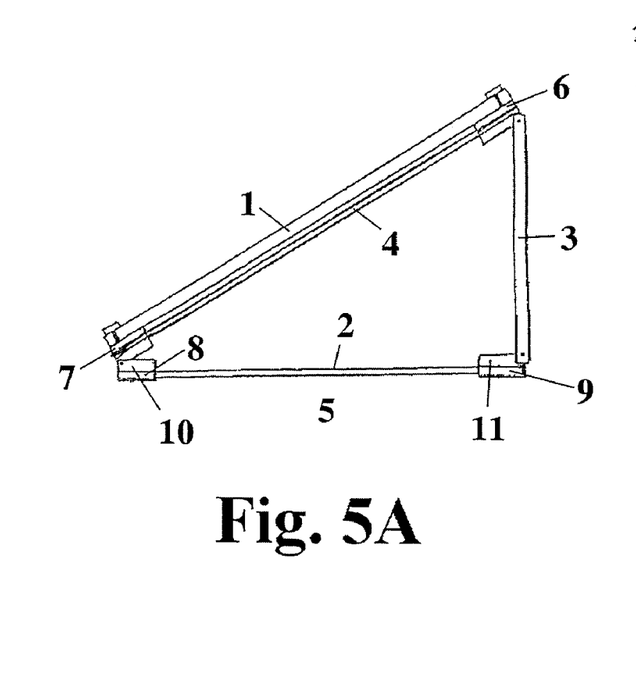
FIGS. 5A-5C the triangular frame assembly as shown in FIG. 1 (FIG. 5A), rotated in the frame assembly plane (FIG. 5B), and the rotated frame with a solar panel mounted on the first frame side (FIG. 5C).
Figure 5B:
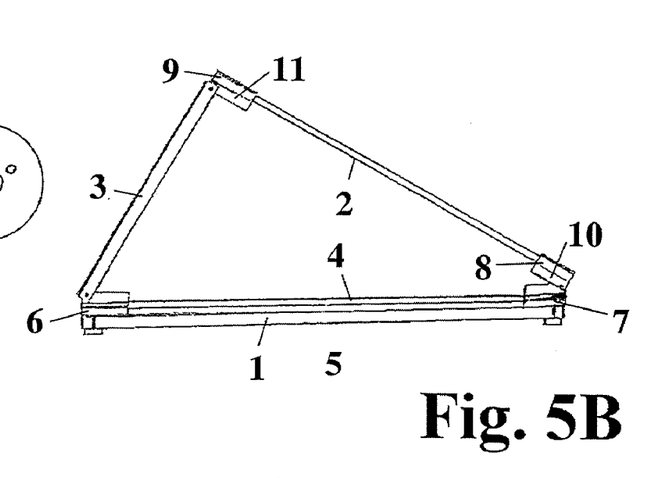
Figure 5C:
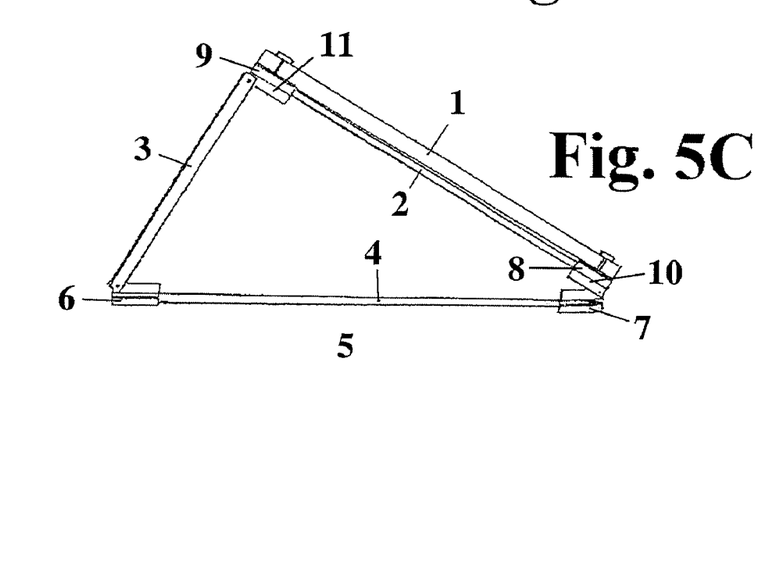

FIG. 5B shows a rotation of the frame assembly in the frame assembly plane, by which the frame sides 2 and 4 are exchanged relative to their location. This rotation allows the fastening of the frame assembly on the roof or floor surface 5 to be carried out by way of the carrier profile 6, 7, whereas the carrier profiles 8, 9 provide a support for the solar module 1 (compare to FIGS. 1 and 5A, showing the original position of the frame). This provides a further adjustment for the mounting of solar modules 1 in addition to the possible displacement of the carrier profiles 8, 9 without the need for a change in the frame assembly. FIG. 5C shows the rotated frame with the solar module 1 mounted to the first frame side.

The carrier profiles 6, 7, 8, 9 are a special profile, namely a T profile, the leg 12 of which in the region of transition to the foot 13 is constructed as a U profile and together with the foot 13 forms a box profile 14. The inner dimensions of the box profile are selected such that the respective profile of the frame side 2, 3, 4 is insertable into the box profile 14 with a slight play and then fastenable.

The solar module 1 is supported on respectively slightly less than half the foot 13 of the carrier profile 6, 7 and is fastened by a solar module clamp 16 positioned in the middle of the foot 13. The foot 13 has a thickening 15 which extends in the middle into the box profile 14, so that the thread for solar module clamp 16 has a sufficient strength against tear out. The interconnection of the carrier profiles 6, 7, 8, 9 constructed as T profiles and of a T profile with a frame side 3 respectively occurs in the leg region of the T profile.

LIST OF REFERENCES NUMBERS

1 Solar module
2 Frame side
3 Frame side
4 Frame side
5 Roof or floor surface
6 Carrier profile element
7 Carrier profile element
8 Carrier profile element
9 Carrier profile element
10 Connection
11 Connection
12 Leg
13 Foot
14 Box profile
15 Thickening
16 Solar module clamp
17 Fastening element
18 Bolt connection

The invention claimed is:

1. A frame assembly for the mounting of solar modules to a floor or roof surface, the frame assembly consisting of at least two triangular flat frames positioned spaced apart, each flat frame having a first, second, and third frame side, whereby:

respectively the third of said frame sides is configured at an inclination to the floor or roof surface;

first and second carrier profile elements for the supporting and fastening of a solar module are respectively movably and fastenably positioned on said third frame side, and wherein said second and first carrier profile elements are respectively also connected with the first and second of said frame sides adjacent to the third side;

the first and second frame sides are movably and fastenably connected with one another and include at least one length adjustment arrangement, and wherein the first frame side has one or more connections to the roof or floor surface;

the third carrier profile element connects the second carrier profile element with the first frame side, wherein said third carrier profile element is movably positioned on the first frame side and connected with the second carrier profile element;

the fourth carrier profile element connects the first and second frame sides, wherein said fourth carrier profile element is movable on the first frame side and rigidly connected with the second frame side; and each carrier profile element has a T profile, having a leg and a foot, wherein the leg comprises a transition region, adjacent to the foot, said transition region having a U profile, which U profile forms a box profile together with the foot.

2. The frame assembly according to claim 1, wherein the first, second, and third frame sides form a triangular frame.

3. The frame assembly according to claim 1, wherein the first and second carrier profile elements are respectively positioned in an end region of the frame side in such a way that they are movable thereon at least partially beyond the end of the third frame side.

4. The frame assembly according to claim 1, wherein the connection of the first carrier profile element with the second frame side is movable and lockable.

5. The frame assembly according to claim 1, wherein the inner dimensions of the box profile are selected such that the respective profile of the frame sides can be inserted into the box profile with slight play and fastened.

6. The frame assembly according to claim 1, wherein a solar module is supported on less than half the foot and fastened to the foot by a solar module clamp positioned in the middle of the foot.

7. The frame assembly according to claim 1, wherein the foot has a thickening which extends in the middle into the box profile.

8. The frame assembly according to claim 1, wherein the second and third carrier profile elements are connected to each other, wherein the first and fourth carrier elements are connected to the second frame side, and wherein said connections occur in the leg region of the T profile of the respective carrier profile elements.

9. The frame assembly according to claim 1, wherein by rotating the triangular frame assembly, consisting of the first, second, and third frame sides in the frame assembly plane, the first frame side previously used for the fastening to the roof or floor surface is used as the frame side for the fastening of the solar module and vice versa.

10. The frame assembly according to claim 1, wherein the first, second, and third frame sides form a right triangular frame.

11. A frame assembly for the mounting of solar modules to a floor or roof surface, the frame assembly consisting of at least two triangular flat frames positioned spaced apart, each flat frame having a first, second, and third frame side, whereby:

- respectively the third of said frame sides is configured at an inclination to the floor or roof surface;
- first and second carrier profile elements for the supporting and fastening of a solar module are respectively movably and fastenably positioned on said third frame side, and wherein said second and first carrier profile elements are respectively also connected with the first and second of said frame sides adjacent to the third side;
- the first and second frame sides are movably and fastenably connected with one another and include at least one length adjustment arrangement, and wherein the first frame side has one or more connections to the roof or floor surface;
- the first, second, and third frame sides each have an angular profile, a U profile, or a T profile; and
- the second frame side, not fastened to the roof or floor surface, has a T profile, having a leg and a foot.

* * * * *

UNITED STATES PATENT AND TRADEMARK OFFICE
CERTIFICATE OF CORRECTION

| | | |
|---|---|---|
| PATENT NO. | : 7,849,849 B2 | Page 1 of 1 |
| APPLICATION NO. | : 11/816044 | |
| DATED | : December 14, 2010 | |
| INVENTOR(S) | : Gido Genschorek | |

It is certified that error appears in the above-identified patent and that said Letters Patent is hereby corrected as shown below:

On the Title Page:

Line (22) PCT Filed: should read --

Dec. 28, 2005

Signed and Sealed this
Tenth Day of May, 2011

David J. Kappos
*Director of the United States Patent and Trademark Office*